United States Patent Office 3,319,101
Patented May 9, 1967

3,319,101
FLAT WINDING CONSTRUCTION FOR ELECTRIC
MACHINES
Rene Bidard, Paris, France, assignor to Cie Electro-
Mecanique, Paris, France, a corporation of France
Filed Apr. 20, 1964, Ser. No. 361,089
Claims priority, application France, Apr. 23, 1963,
932,426, Patent 1,371,795
16 Claims. (Cl. 310—268)

It is a disadvantage of electric machines with a flat air gap having flat windings formed by bare laminated conductors arranged on at least one of the sides of a flat insulating support that as the most useful portion of these conductors is radial or substantially so, their width in this portion increases with the radius, as the insulating interval which separates them is substantially constant. Under these conditions, if the available surface is used to best advantage at the inner radius, it is poorly utilized at the outer radius.

This disadvantage exists on fixed windings as well as on movable windings, and regardless of the type of the machine—motor or generator, for direct or alternating current, single or poly-phase, with or without collector, commutator, phase changer, etc.

The present invention relates to a new form of construction of such windings, which remedies this disadvantage and may be applied to all the above-mentioned types of machines.

Its essential characteristic consists in dividing, on each side of the support, the surfaces receiving these conductors and their connections into concentric annular zones, assigning to all these zones the same pole number, arranging in each zone substantially radial conductors in a number increasing with the mean radius of the zone considered, each of said conductors having substantially the same average width in all zones, and connecting these conductors together on both sides according to any appropriate combination.

By arranging in all zones radial conductors having substantially the same average width, and as the number of these conductors in each zone may increase substantially like the mean radius thereof, it is possible on the one hand to obtain a substantially equal current density in all these conductors and, on the other hand, to form windings for increasingly high voltages by suitably connecting all these conductors in series.

The invention can be carried into effect in many ways according to the electrical characteristics of the machine, the number of zones present, the number of conductors in each of them, and the nature of the primary field.

There are described below, as non-limitative examples, various embodiments in which the number of the connections traversing the support at each zone limit is the minimum.

This is a favorable condition for the design of the machine, but it is obviously not indispensable. This minimum number is equal to the difference between the numbers of the conductors in the two zones considered. In fact, if there are $n_j$ conductors in the one and $n_{j+1}$ in the other, it is possible at the most on one and the same side to connect together directly $n_j$ conductors on each zone. In the $(j+1)$ zone there then remain $n_{j+1}-n_j$ conductors on each side which must be connected together by traversing connections.

In these figures, the insulating support 1 is a disk pierced with a central opening for the passage of the shaft of the machine. It is represented in solid lines, either by arc of circle or by entire circles.

The conductors situated on the face of the support are called "going" and are represented in solid lines as are the connections which attach themselves thereto. The conductors situated on the back are called "return" and are represented in broken lines as are their connections. Lastly, the traversing connections are represented by a large dot and the zone limits or the pole sectors are indicated by a chain-dotted line.

Figure 1:
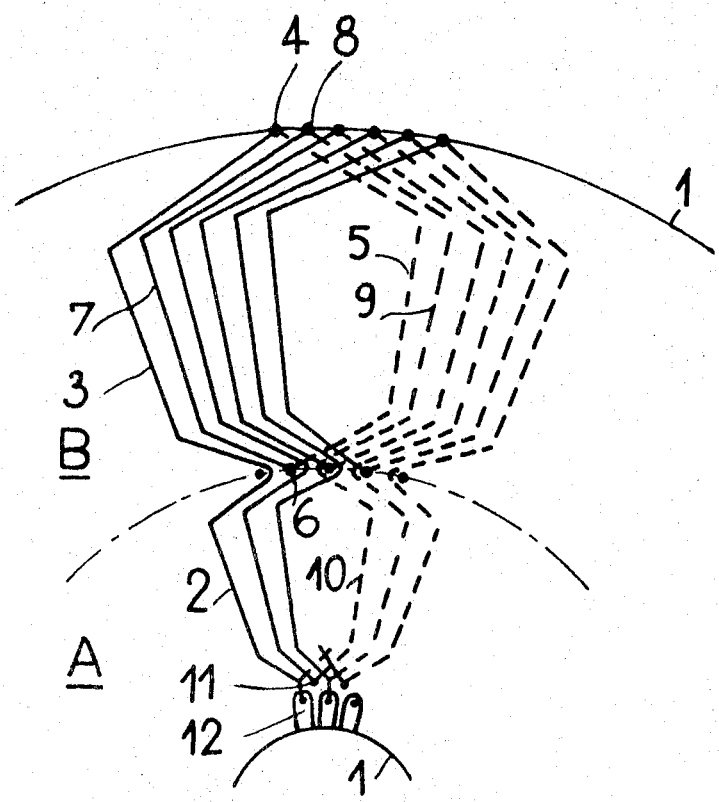
FIGURES 1 to 14 show various connection diagrams for the windings.

FIGURE 1 shows an imbricated winding having two zones A and B, the second having twice as many conductors as the first.

This winding is formed as follows:

The going conductor 2 in zone A is connected by a non-traversing connection to the going conductor 3 in zone B. The latter is connected by a traversing connection 4 to the return conductor 5 distant from the preceding by about one pole pitch. By a traversing connection 6 the conductor 5 is connected to the going conductor 7, which is itself connected to the return conductor 9 by a traversing connection 8. Lastly, the conductor 9 is connected by a non-traversing connection to the return conductor 10, which by a traversing connection 11 is connected to a new going conductor of zone A, and so forth. It has been here supposed that there is a collector formed of blades such as 12 connected to one turn out of two of zone A.

In this way there have been put in series without crossing of connections one conductor of zone A and two conductors of zone B of each side at least of a single traversing connection 6 at the boundary circle between the two zones. There has been formed one turn extending over both zones and one turn extending over zone B only, and these two turns are in series.

Figure 2:
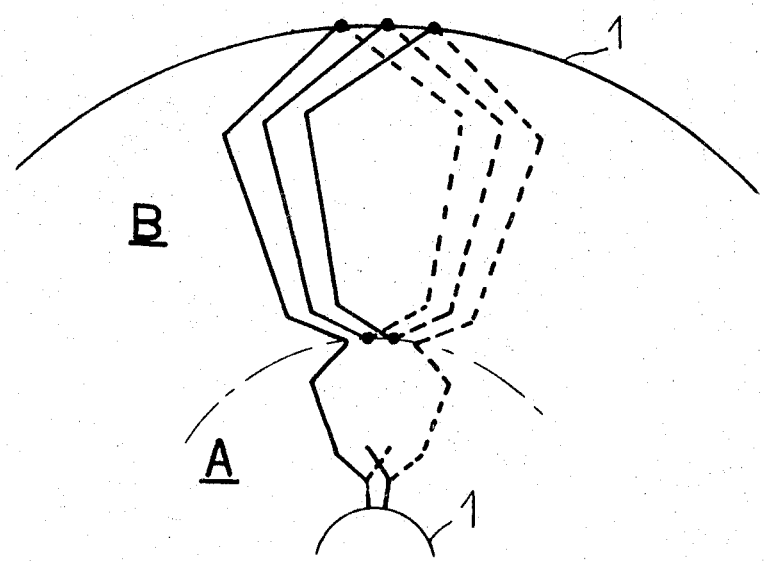

FIGURE 2 shows an imbricated winding in which zone B contains three times as many conductors as zone A. In each turn effecting both zones there are inserted two turns affecting zone B, these turns all being in series and forming a repetitive assembly. The number of traversing connections at the boundary circle between the two zones is two for such as assembly.

Figure 3:
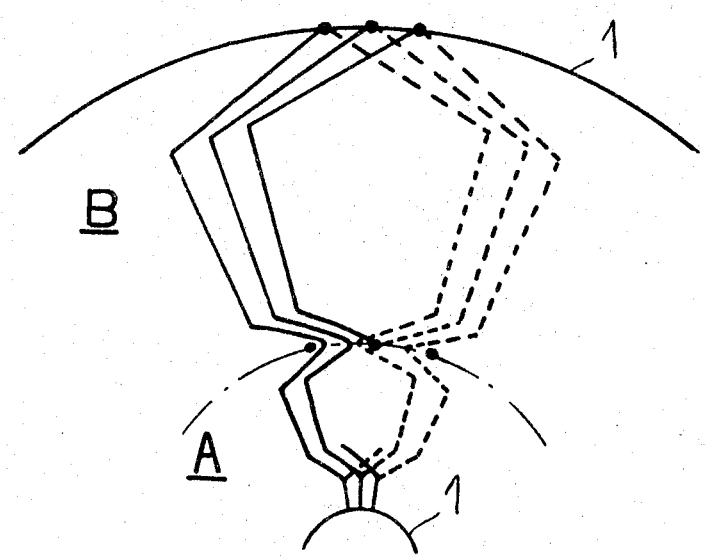

FIGURE 3 shows an imbricated winding in which the ratio of the number of conductors in zones B and A is as 3:2. For two turns affecting both zones there is one effecting zone B only, and a single traversing connection at the limit of the two zones for this assembly.

It is seen that if the diagram of FIGURE 1 permits a ratio of 2 to 1 between the number of conductors of the two zones, diagrams similar to that of FIGURE 2 permit all ratios of integers higher than 2. It suffices to intercalate in the outer zone a suitable number of turns in series (that is, either 2 as in FIGURE 2, giving a ratio 3, or 3, 4 etc. . . . . $n$ turns); on the other hand, diagrams similar to that of FIGURE 3 permit all the ratios of less than 2, of the form $$k+1/k$$

where $k$ is an integer, and this by intercalating a turn effecting only the outer zone every $k$ turns affecting both zones.

Figure 4:
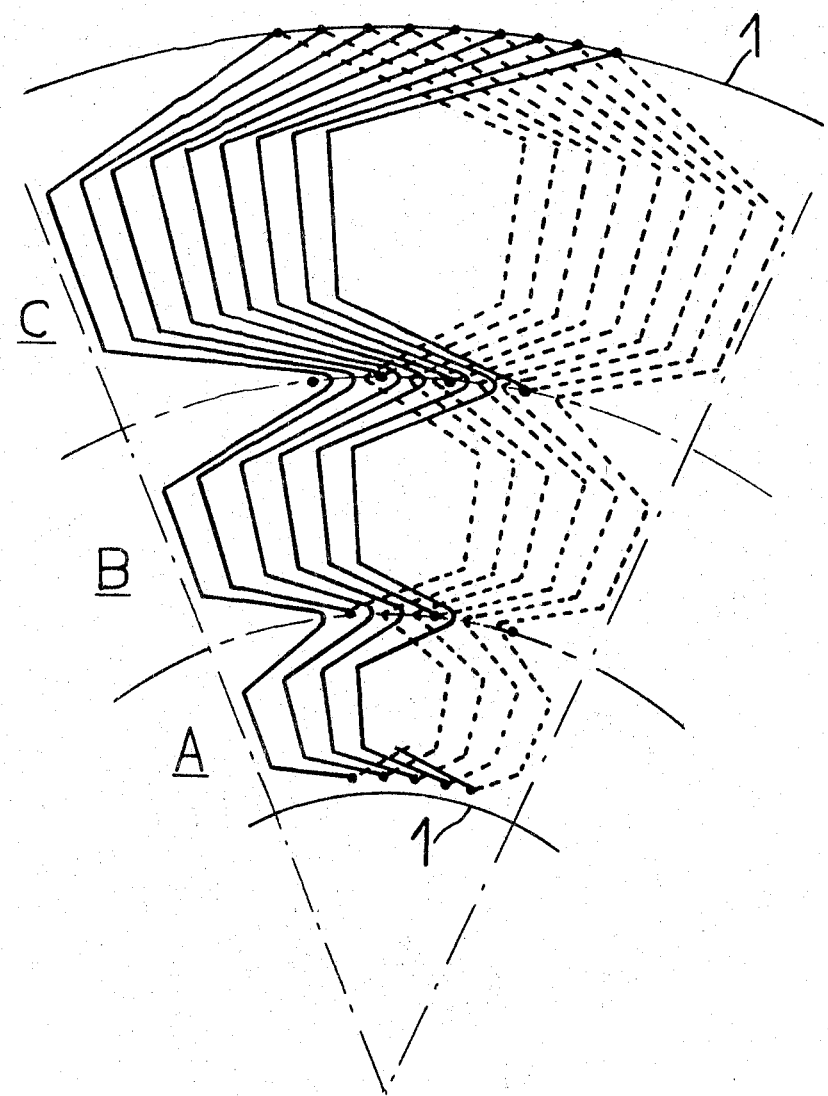
Figure 5:
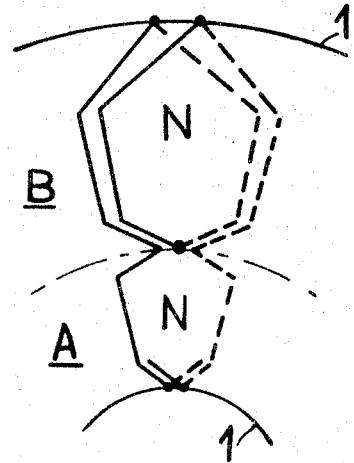
Figure 6:
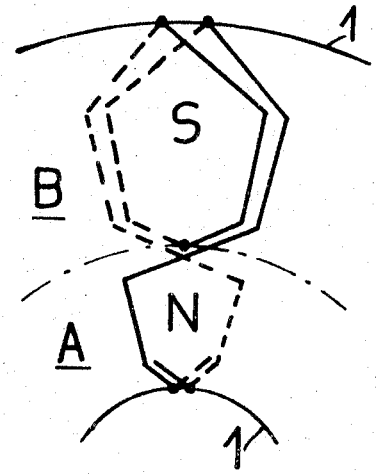
Figure 7:
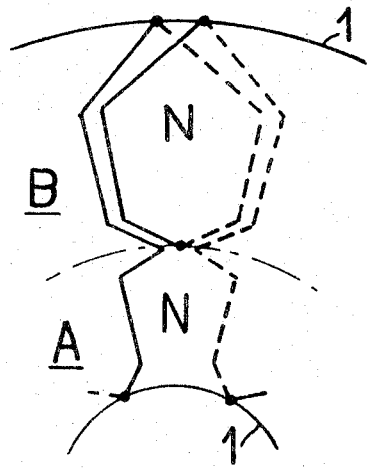

FIGURE 4 shows an imbricated winding of three zones A, B, C in which the number of conductors in each zone are to each other as the numbers 4, 6 and 9. There is formed successively one turn affecting A, B and C, one turn affecting B and C, one turn affecting C, one turn affecting A, B and C, one turn affecting A, B and C, one turn affecting C, one turn affecting B and C, one turn affecting A, B and C and one turn affecting C. Then the winding continues again repeating the same sequence. The number of traversing connections is two at the limit of A and B, and three at the limit of B and C for each of these susceptible assemblies.

It is obvious that this type of three-zone winding is susceptible of the same variants as those described above for two zones, which variants permit the numbers of respective conductors of the three zones to be varied within wide limits.

It is also obvious that these solutions naturally extend to any number of zones greater than three.

In the various examples given above, the poles of the different zones in one and the same sector are of the same polarity. On the other hand, if there are more than two poles (more than one pole pitch), the conductors of the different pole pitches cannot be put in series from the viewpoint of voltage, but must be put in parallel, by means of a collector. One can proceed differently by introducing undulated windings and by getting rid of the condition of putting poles of the same polarity in the different zones of each pole sector. This permits the formation of series windings in which all conductors of all pole pitches are effectively put in series from the viewpoint of voltage.

Various possible combinations are represented as examples in FIGURES 5 to 12 in the case of two zones A and B whose numbers of conductors are in the ratio 2.

In FIGURES 5, 7, 9 and 11, in which the poles correspond to one another in each zone, the windings in the latter are, respectively, imbricate, imbricate-imbricate, undulated-imbricate, imbricate-undulated, and undulated-undulated.

In FIGURES 6, 8, 10 and 12, the poles are of opposite polarities and the windings are, again, respectively, imbricate-imbricate, undulated-imbricate, imbricate-undulated, and undulated-undulated.

It is clear that the different diagrams may be transposed to ratios of numbers of conductors other than 2 by proceeding in a manner analogous to that which permits passing from FIGURE 1 to FIGURES 2 and 3; for this it suffices to modify the number of traversing connections at the zone limits, thereby permitting either to remain longer in the same zone, or on the contrary, to pass sooner to the next zone.

Figure 8:
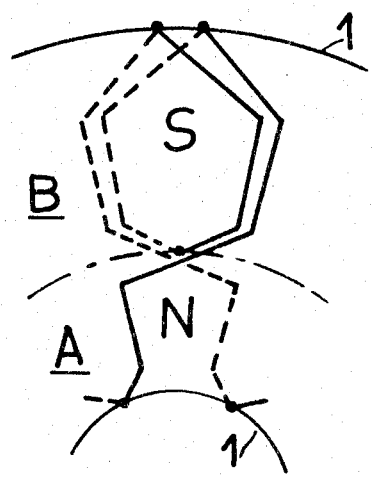
Figure 13:
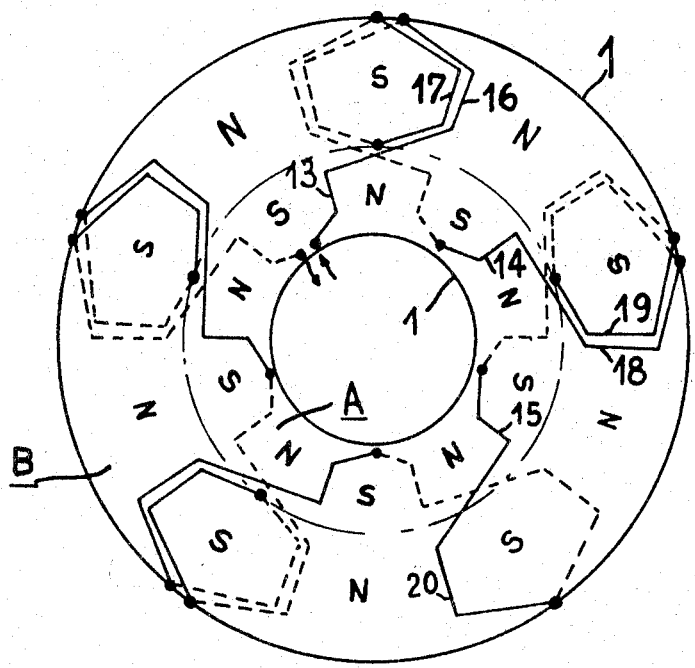

FIGURE 13 is an example of such a transposition, derived from the diagram of FIGURE 8, for a machine of 10 poles and two zones A and B supposed to have, respectively, 51 to 85 conductors. These numbers are here in the ratio 3:5, that is, to three conductors of zone A must be associated five conductors of zone B. As the winding in zone A is undulated, it comprises one conductor per side in each polar interval taken successively, so that after having travelled three of these successive intervals, there have been used three conductors in zone A and there must have been used five in zone B. This has been done with the conductors 13, 14 and 15 of zone A and conductors 16, 17, 18, 19 and 20 of zone B. It thus suffices to continue identically in the same manner to utilize all the conductors of both zones. The assembly of the conductors 13 to 20 mentioned above constitutes a "winding unit" which it suffices to repeat a certain number of times to obtain the putting in series of all the conductors of both zones, this number naturally being the greatest common denominator of the two numbers of these conductors, namely 17 in the particular case of this example.

In FIGURE 13 the winding has been stopped at the end of one revolution, so that the second winding unit is not represented entirely in it; the last third is missing.

Figure 14:
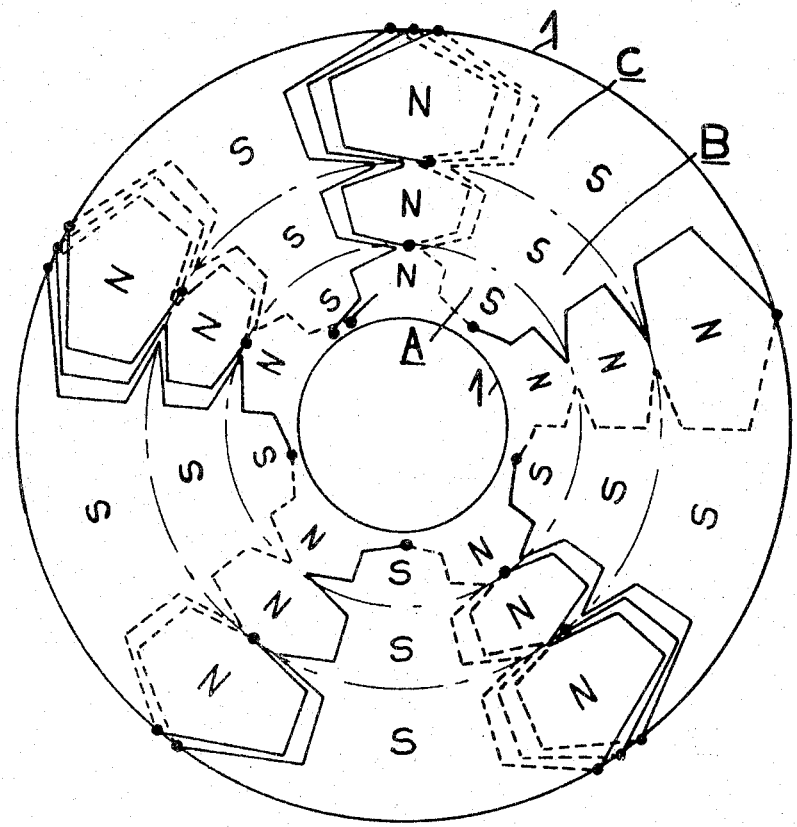

FIGURE 14 shows as a variant the winding of a machine of 10 poles of three zones A, B, C, in which the poles are all of the same polarity in each pole sector and the windings are, respectively, undulated, imbricated, imbricated.

The numbers of conductors are here, respectively, 44, 66 and 99, that is, they are to one another as the numbers 4, 6 and 9. The repetitive winding unit is obtained when one has connected in series four conductors of zone A, six of zone B, and nine of zone C. The complete winding is terminated when one has reproduced this winding unit successively 11 times (11 being the greatest common denominator of the numbers of conductors of the three zones). In FIGURE 14, the winding has been stopped at the end of one revolution, that is, after having put in place one complete repetitive assembly of conductors in series extending over four pole sectors, plus a subassembly in series affecting the fifth pole sector.

In a general manner, if $N_1$, $N_2$, $N_3$ etc. . . . represent the total number of conductors of each of the zones A, B, C etc. . . . it is of interest to choose these numbers so that their greatest common denominator will be as great as possible. The quotient of $N_1$, $N_2$, $N_3$ etc. by this denominator gives the minimum number of conductors of each zone to be connected in series to constitute a "winding unit," that is, an assembly which must be reproduced a number of times equal to said common denominator to utilize the $N_1+N_2+N_3+$ . . . conductors of all zones.

Moreover, if one of the windings is undulated, for the winding to close correctly in this zone, the relation $N=kp\pm1$ must be fulfilled, in which $p$ designates the number of pairs of poles, $k$, an integer, and $N$, the number of conductors of said zone. This condition is well fulfilled in examples of FIGURES 13 and 14 above.

In the latter, only the winding of the internal zone (A) is undulated, but it is obvious that this form of winding may also be used for other zones. Likewise, when there are more than two zones, the diagrams of FIGURES 5 to 12 are applicable to each assembly of two successive zones.

The various examples given above show that it is always possible, for each polarity, to choose numbers of conductors such that the winding closes. Also, it is always possible to choose the order of association of the conductors and the form of the connections connecting them to avoid any crossing on one and the same side and to suitably distribute the traversing connections to each zone limit.

Figure 9:
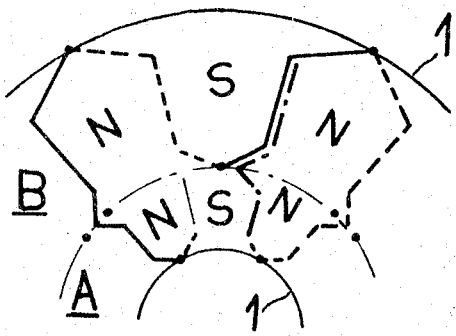
Figure 10:
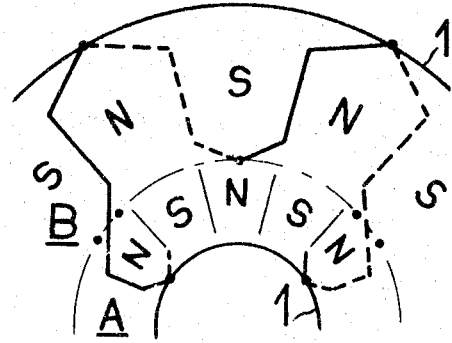
Figure 11:
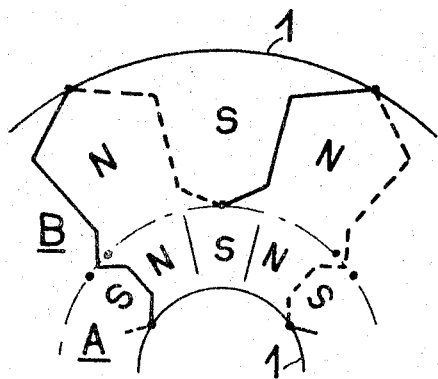
Figure 12:
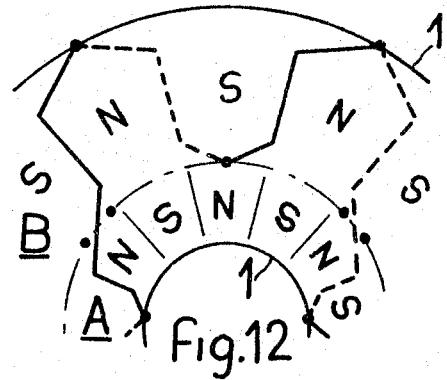
Figure 15:
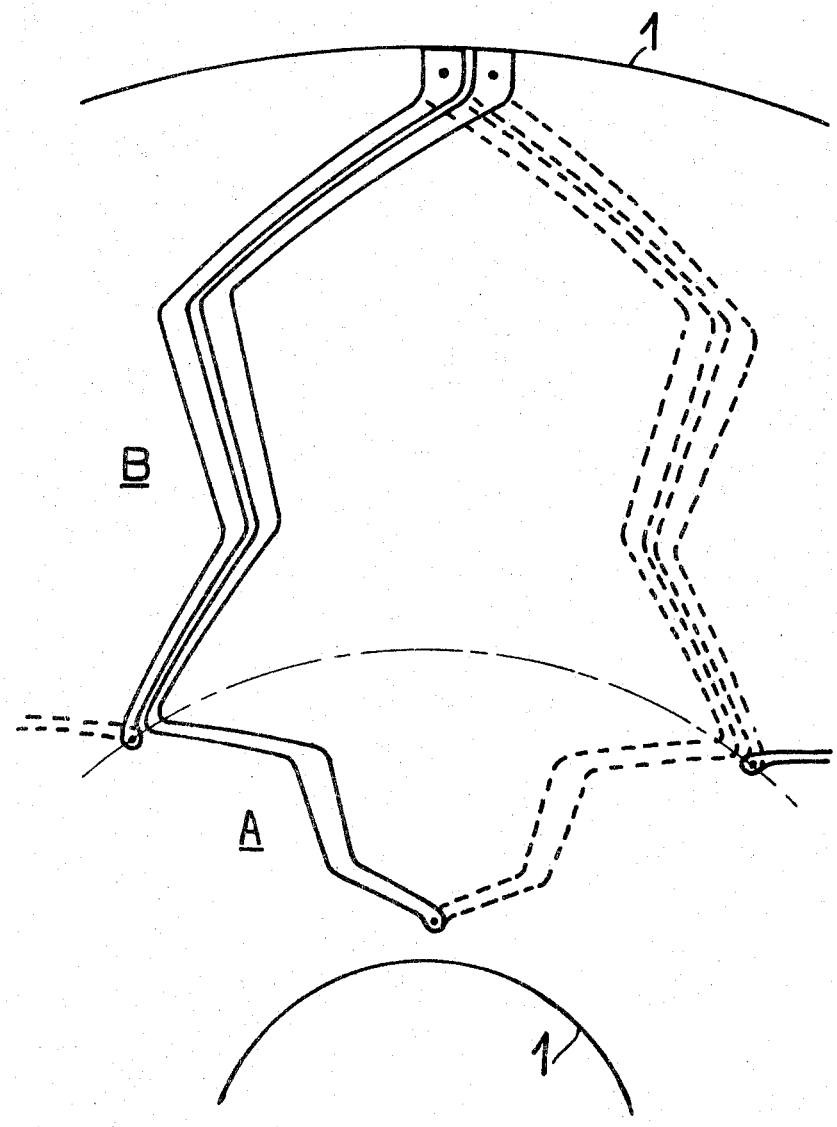
FIGURE 15 shows a construction corresponding to FIGURE 9.

FIGURE 15 illustrates the material realization of the start of a winding made according to the diagram of FIGURE 9. It shows how, according to the invention, to each radial conductor of zone A there correspond two radial conductors in zone B having substantially the same width as it.

I claim:

1. In a rotary electric machine of the type having a flat air gap and a flat support of insulating material on which bare lamellar conductors are applied to both sides thereof, the improvement wherein both sides of said support are divided into concentric annular zones, said zones on both sides of said support are provided with substantially radially extending lamellar conductors all of which have the same average width, an outer zone being provided with more conductors than are provided on an inner zone, the outer ends of conductors on opposite sides of said support adjacent the outer periphery of the outermost zone being connected together, the inner ends of conductors on opposite sides of said support adjacent the inner periphery of the innermost zone being connected together, the inner and outer ends respectively of certain of said conductors on adjacent zones on the same side of said support being connected together, and the inner ends of certain of said conductors of the same zones on opposite faces of said support being connected together, all of said conductor connections serving to establish a single winding on said support, and wherein the same number of magnet poles are provided respectively for the conductors of all zones.

2. The invention as defined in claim 1 wherein a repetitive assembly of conductors is formed from a number of conductors in each zone equal to the quotient of the total number of conductors in such zone by the greatest common denominator of the numbers of conductors of all zones.

3. The invention as defined in claim 2 wherein said repetitive assembly of conductors extends over a plurality of pole sectors.

4. The invention as defined in claim 2 wherein the complete winding on said support is comprised of a plurality of said repetitive assemblies equal to said greatest common denominator.

5. The invention as defined in claim 1 wherein the magnet poles of different zones in the same sector of said support are of the same polarity.

6. The invention as defined in claim 1 wherein the magnet poles of different zones in the same sector of said support are of opposite polarity.

7. The invention as defined in claim 1 wherein each side of said support and the conductors thereon are arranged in two concentric annular zones, there being twice as many conductors in said outer zone as are provided in said inner zone, and the inner ends of certain of said conductors on the outer zones on opposite sides of said support being connected together at the boundary circle between said annular zones.

8. The invention as defined in claim 7 wherein the conductors located in both zones on each side of said support established imbricate windings.

9. The invention as defined in claim 8 wherein the magnet poles of both zones in the same sector of said support are of the same polarity.

10. The invention as defined in claim 8 wherein the magnet poles of both zones in the same sector of said support are of opposite polarity.

11. The invention as defined in claim 7 wherein the conductors located in one zone on each side of said support established an imbricate winding and the conductors located in the other zone on each side of said support establish an undulate winding.

12. The invention as defined in claim 11 wherein the magnet poles of both zones in the same sector of said support are of the same polarity.

13. The invention as defined in claim 11 wherein the magnet poles of both zones in the same sector of said support are of opposite polarity.

14. The invention as defined in claim 7 wherein the conductors located in both zones on each side of said support establish undulate windings.

15. The invention as defined in claim 14 wherein the magnet poles of both zones in the same sector of said support are of the same polarity.

16. The invention as defined in claim 14 wherein the magnet poles of both zones in the same sector of said support are of opposite polarity.

References Cited by the Examiner

UNITED STATES PATENTS 3,046,427 6/1962 Henry-Baudot _____ 310—268
3,109,114 10/1963 Henry-Baudot _____ 310—268

FOREIGN PATENTS 1,345,007 10/1963 France.

MILTON O. HIRSHFIELD, *Primary Examiner.*

J. W. GIBBS, *Assistant Examiner.*